United States Patent [19]

Porter et al.

[11] Patent Number: 5,244,968

[45] Date of Patent: Sep. 14, 1993

[54] AQUEOUS-DISPERSED POLYMER COMPOSITIONS CONTAINING CYANOALKYL ESTERS OF UNSATURATED CARBOXYLIC ACIDS

[75] Inventors: David Porter, Terneuzen, Netherlands; Peter Hentzschel, Oberursel, Fed. Rep. of Germany

[73] Assignee: The Dow Chemical Company, Midland, Mich.

[21] Appl. No.: 171,621

[22] Filed: Mar. 22, 1988

[51] Int. Cl.$^5$ .............................................. C08J 33/00
[52] U.S. Cl. .................................... 524/816; 524/812; 526/312
[58] Field of Search ................. 524/812, 816; 526/312

[56] References Cited

U.S. PATENT DOCUMENTS

| | | | |
|---|---|---|---|
| 3,575,913 | 4/1971 | Meier | 524/822 |
| 3,957,710 | 5/1976 | Rohmann et al. | 526/312 |
| 4,364,876 | 12/1982 | Kimura et al. | 526/312 |

FOREIGN PATENT DOCUMENTS

| | | | |
|---|---|---|---|
| 2069007 | 9/1971 | France. | |
| 0242384 | 3/1982 | U.S.S.R. | 524/812 |

*Primary Examiner*—Joseph L. Schofer
*Assistant Examiner*—Peter Mulcahy

[57] ABSTRACT

Aqueous-dispersed polymer compositions are prepared comprising polymerized therein (a) monovinylidene aromatic monomer (e.g., styrene), (b) acyclic conjugated diene monomer (e.g., butadiene), and (c) ethylenically unsaturated carboxylic acid monomer(s) (e.g. acrylic and or fumaric acid) and are further benefited by polymerizing therein (d) a cyanoalkyl ester of an ethylenically unsaturated carboxylic acid. The aqueous-dispersed polymers can also comprise polymerized therein an ethylenically unsaturated nitrile monomer such as acrylonitrile. The use of the cyanoalkyl ester, such as 2-cyanoethylmethacrylate (2-CEMA), results in latex polymers with improved performance in paper coating formulations. In particular, paper coatings can be prepared which have improved performance (i.e., wet and dry pick resistance) in offset printing applications.

6 Claims, No Drawings

AQUEOUS-DISPERSED POLYMER COMPOSITIONS CONTAINING CYANOALKYL ESTERS OF UNSATURATED CARBOXYLIC ACIDS

This invention relates to an improved aqueous-dispersed polymer composition and to paper coating compositions containing these polymer dispersions.

Aqueous dispersions of polymers, known as latexes, have a great variety of commercial applications such as coatings, adhesives, and the like. Various types of latex compositions are currently being very widely used in the area of paper coating. These latexes are typically aqueous dispersions of copolymers of (a) a monovinylidene aromatic monomer, such as styrene; (b) an acyclic conjugated diene, such as butadiene; and (c) minor amounts of various other optional monomers, such as unsaturated nitrile monomers and unsaturated carboxylic acid monomers. See for example U.S. Pat. No. 3,575,913 where these types of latex materials are described. While such compositions provide very desirable paper coatings, there is always an interest in developing improved paper coating compositions which can be used to provide coated paper which can be printed at greater speeds and/or provide better quality printed materials.

In Russian Authorship Certificate 242384, published 30 Mar. 1982, vulcanized synthetic latex rubbers of butadiene and several vinyl monomers are taught to have improved properties when containing beta-cyanoethylmethacrylate.

In French Patent 2 069 007, the use of cyanoethylacrylate-containing acrylate-based latexes in laminates and protective coatings is suggested.

Neither paper coating nor the use of an additional acid monomer is suggested for the latex polymers prepared in either of these references.

In this regard there is obtained according to the present invention an improved aqueous-dispersed polymer composition comprising polymerized therein (a) monovinylidene aromatic monomer, (b) acyclic conjugated diene monomer, and (c) ethylenically unsaturated carboxylic acid monomer(s) characterized in that the polymer also comprises polymerized therein (d) a cyanoalkyl ester of an ethylenically unsaturated carboxylic acid. In contrast to the vulcanized rubber materials described in Russian Authorship Certificate 242384, these are obviously preferred to be unvulcanized.

In another aspect, the invention is also an improved paper coating latex polymer and a latex-coated paper wherein the latex comprises a polymer having polymerized therein monovinylidene aromatic monomer, acyclic conjugated diene monomer and ethylenically unsaturated carboxylic acid monomer characterized by also having polymerized therein at least 0.5 parts by weight of cyanoalkyl ester(s) of ethylenically unsaturated aliphatic carboxylic acid(s).

The improved polymers according to the present invention preferably comprise polymerized therein: (a) 20 to 90 weight percent monovinylidene aromatic monomer, (b) 9 to 79 weight percent acyclic conjugated diene, (c) 0.5 to 10 weight percent of ethylenically unsaturated carboxylic acid, and (d) 0.5 to 15 weight percent of cyanoalkyl ester(s) of ethylenically unsaturated aliphatic carboxylic acid(s). In a preferred embodiment of the present invention the polymer comprises polymerized therein: (a) styrene: (b) butadiene: (c) one or more of the unsaturated carboxylic acid monomers selected from the group of acrylic, methacrylic, fumaric, itaconic, crotonic, and maleic: and (d) the 2-cyanoethyl ester of acrylic or methacrylic acid. The weight percentages (a), (b), (c) and (d) are based upon 100 total weight percent of these components.

In general the latex compositions according to the present invention can be prepared by the latex polymerization processes which are generally known in the art, wherein the acid monomer and the cyanoalkyl ester are included into the polymerization reaction either separately or together as a separate component/feed stream or with one or more of the other monomeric component feed streams. Representative processes include those described in U.S. Pat. Nos. 3,575,913 and 3,563,946, and German Patent Publication 1,905,256.

The polymers according to the present invention have been found to provide improved latex-coated paper and comprise as an essential element cyanoalkyl ester(s) of ethylenically unsaturated carboxylic acid(s). Preferably this is an aliphatic, mono- or difunctional carboxylic acid. Such acids include, for example, acrylic acid, methacrylic acid, fumaric acid, itaconic acid, crotonic acid, and/or maleic acid. It is also, of course, possible to start with the acid anhydride and prepare the cyanoalkyl ester therefrom. These compounds are often referred to as omegacyanoalkyl esters and are generally represented by the formula I, below:

$$R_1\text{---}CH\text{=}CR_3\text{---}CO\text{---}O\text{---}R_2\text{---}C\text{≡}N \qquad I$$

wherein independently, $R_1$ and $R_3$ are monovalent radicals of hydrogen or a lower alkyl having 1 to 4 carbon atoms with or without a second carboxylic acid functionality or cyanoalkyl ester thereof: and $R_2$ is a bivalent radical of a linear or branched alkyl having 1 to 4 carbon atoms. In preferred embodiments of the invention, independently, $R_1$ is hydrogen, $R_2$ has two carbons (i.e., is a ethylene) and $R_3$ is ethyl or methyl. It is most preferred to use either 2-cyanoethylacrylate or 2-cyanoethylmethacrylate (2-CEMA) and most preferably 2-CEMA.

According to the present invention it has been found that the use of cyanoalkyl ester in the abovedescribed latex polymers provides improved paper coatings when the cyanoalkyl ester is contained in the polymeric portion of the aqueous polymer dispersions in amounts of 0.5 to 15 weight percent, preferably 0.5 to 6 weight percent, and more preferably 1 to 5 weight percent.

The polymers according to the present invention otherwise contain monovinylidene aromatic monomer(s) of the types and in the amounts generally used in latex compositions known in the art. As used herein, the term monovinylidene aromatic monomer refers to compounds represented by formula II, below:

$$Ar\text{---}CR_4\text{=}CH_2 \qquad II$$

wherein Ar is a substituted or unsubstituted aromatic ring and $R_4$ is hydrogen or lower alkyl having 1 to 4 carbon atoms. The monovinylidene aromatic monomer is preferably styrene or an alpha- or ring-substituted methyl styrene, most preferably styrene. In general, the monovinylidene aromatic monomer is included in the latex polymer in amounts of 20 to 90 weight percent, preferably 40 to 70 weight percent, and most preferably 60 to 70 weight percent.

As with the monovinylidene aromatic monomer, the amounts and types of acyclic conjugated dienes suitable for use in the present invention are generally known in the art. The acyclic conjugated dienes suitable for use in the present invention include butadiene and other acyclic compounds having at least two sites of ethylenic unsaturation separated from each other by a single carbon-to-carbon bond such as isoprene and chloroprene. The 1,3-butadiene-based hydrocarbons and especially 1,3-butadiene are preferred for use in the present invention. As is also known in the art, the acyclic conjugated diene monomer can be at least partially replaced by the alkyl esters of acrylic and/or methacrylic acid which similarly form polymers having fairly low glass transition temperatures.

Typically these acyclic conjugated dienes are used in amounts of 9 to 79 weight percent, preferably 24 to 54 weight percent, and most preferably 30 to 40 weight percent.

The polymers according to the present invention also contain polymerized therein an ethylenically unsaturated carboxylic acid monomer. These monomers are generally well known in the art. It is preferred for the practice of the present invention to use ethylenically unsaturated aliphatic mono- or dicarboxylic acid(s) or acid anhydride(s) containing 3 to 5 carbon atoms. Such acids include acrylic acid, methacrylic acid, fumaric acid, itaconic acid, crotonic acid, maleic acid, and maleic anhydride. Of these, fumaric acid, acrylic acid, or combinations of the two are preferred.

The ethylenically unsaturated carboxylic acid monomer can be used in the compositions according to the present invention in amounts of 0.5 to 10 weight percent, preferably 0.5 to 4 weight percent and most preferably 1 to 3.5 weight percent. The use of this monomer affects the properties of the polymer dispersion and paper coating composition and the type and the amount which are used are determined thereby.

It is also possible to include additionally an amount of an ethylenically unsaturated aliphatic nitrile monomer. Typically such nitrile monomers should contain 2 to 4 carbon atoms in a linear or branched chain which may optionally be substituted with halogen, acetyl, or additional nitrile group. Such nitrile monomers include acrylonitrile, methacrylonitrile, chloroacrylonitrile, and fumaronitrile, with acrylonitrile being preferred. This optional nitrile monomer can be included in amounts up to 14.5 parts by weight based 100 total weight parts monomers, preferably (if used) 0.5 to 14.5 parts by weight and more preferably 5 to 14 parts by weight.

Regarding the monomers that are used in addition to the cyanoalkyl ester monomer, the particular monomers and the amounts which are used are chosen to provide a resultant polymerized composition which has a glass transition temperature between $-30°$ C. and $+40°$ C., preferably between $0°$ C. and $+30°$ C., as measured by differential thermal analysis.

As compared to paper coating compositions with latex polymers according to the prior art not containing the cyanoalkyl ester monomer, the compositions according to the present invention when used in paper coating compositions, provide the coated paper with surprisingly improved wet pick resistance without loss of the other desirable properties in coated paper such as gloss, brightness and dry pick. As is well known in the art, when latex coated paper is printed in offset printing processes, the paper with and without printing is exposed during the printing process to water, ink and pressure. Unless the coating binder is optimized this process can result in a weakened coating and the coating being removed from the paper by the printing blanket (wet and dry "picking"). The polymer compositions according to the present invention can be used to provide paper coating compositions (as described below) which, when coated on paper, will reduce these types of problems when printing such paper in offset printing processes.

As mentioned above, the polymer dispersions prepared according to the present invention are suitable for providing very desirable paper coating compositions. The paper coating compositions in which these polymer dispersions can be incorporated, also called coating colors, are themselves well known in the art. These paper coating compositions are typically based on one of the well known pigments such as Kaolin, calcium carbonate, talc, gypsum, titanium dioxide, montmorillonite, bentonite or combinations of these materials. Dispersing agents are typically incorporated in such paper coating compositions, such as, for example, polyacrylate, pyrophosphate, hexametaphosphate and the like. Further optional components of coating colors are well known and may include defoamer, optical brightening agent, release agent and even amounts of polymeric resin as cobinders. Such co-binders can include carboxymethyl cellulose, hydroxy ethyl cellulose, starch and starch derivatives, polyvinyl alcohol, polyvinyl acetate, casein, and alginate or other proteins. Synthetic thickeners such as alkali soluble or swellable latexes are also used in some paper coating compositions. See for example, EP 93 206 and EP 109 463. In general, these above-mentioned components of paper coating compositions are employed in the following amounts based on 100 weight parts pigment: binder component, 1 to 30 parts by weight: dispersing agent, up to 8 parts by weight; miscellaneous optional components, up to 10 parts by weight.

When these components are combined to form a paper coating composition, the pH may be somewhat low and it is then necessary to bring the composition pH into a range of 4 to 12. This is typically done using a sufficient amount of alkali hydroxide or ammonia. The solids content of the paper coating composition is typically adjusted with water to a solids content in the range of 30 to 75 percent. The resultant paper coating compositions can be used in the applications known in the art for these materials, including paper, paper board, or any paper-like material which needs a coated surface for printing in an offset printing process.

In the following examples a standard paper is coated with various paper coating compositions based on latex materials with and without the cyanoalkyl ester material to illustrate the advantages obtained according to the practice of the present invention. In the following examples the monomer compositions identified in Table I below were polymerized to form polymer dispersions according to the following polymerization process. The initial charge to a heated reactor consisted of 85 weight parts water; 0.02 weight parts Versenol 120 brand chelating agent containing trisodium salt of hydroxyethyl ethylenediamine triacetic acid (#EDTA); 0.1 weight part Dowfax 2A-1 brand surfactant containing C-12 alkylated diphenyloxide disulfonate sodium salt; and 0.6 weight parts seed latex (based on solids) of a polystyrene based polymer having an average particle size of approximately 0.03 micrometers.

When the reactor temperature reaches $80°$ C. the feeding of the following mixtures are started, continuing over a 4 to 5 hour period. The monomer mixtures, more specifically identified in Table I contain styrene, butadiene, the additional monomer(s) and 6 weight parts carbon tetrachloride. The initiator mixture which is supplied concurrently contains 20 parts by weight water, 0.8 weight parts ammonium persulfate, 0.2 to 1 weight part sodium hydroxide or sodium bicarbonate, 0.4 to 1 weight part Dowfax 2A-1 brand surfactant. Versenol and Dowfax are registered trademarks of The Dow Chemical Company.

After the addition of these mixtures, the reactor mixture is held at 80° to 90° C. for 1.5 to 2 hours, then cooled to 30° C. The resultant latexes had the compositions and characteristics as described below in Table I.

TABLE I

LATEXES

| Latex No. | Monomer Feed Composition | Solids Content (%) | Particle Size (A) | MFFT (°C.) | Residue 45μ (%) | Residue 150μ (%) |
|---|---|---|---|---|---|---|
| 1* | S/B/AA/ 67/30/3 | 50 | 1410 | 20 | 0.007 | 0.107 |
| 2 | S/B/AA/CEMA 64/30/3/3 | 54 | 1410 | 18 | 0.009 | 0.35 |
| 3* | S/B/FA 67/30/3 | 52 | 1530 | 24 | 0.017 | 0.17 |
| 4 | S/B/FA/CEMA 64/30/3/3 | 50 | 1600 | 22 | 0.0007 | 0.072 |

*Comparative Example — Not an example of the present invention

In the above table the Particle Size is measured by a Brice-Phoenix particle size measurement device. The MFFT (minimum film forming temperature) is measured at pH of 6 and solids content of 47%. The Residue is calculated as percent dry residue based on wet latex. The amounts in the respective columns represent weight percentages of the latex that were retained by a first 150 micrometer screen and a second 45 micrometer screen.

The latexes as described above were used in preparing coating color formulations by combining 10 weight parts thereof (based on solids) with 100 parts by weight Dinkie A brand kaolin clay, 1 part by weight Finnfix 10 brand carboxymethylcellulose. Dinkie A is a registered trademark of English China Clay and Finnfix 10 is a registered trademark of Metsaeleeton. The coating color is adjusted with water to a solids content of 60 percent and the pH is adjusted to 8.5 with sodium hydroxide. A standard, wood-free paper (80 grams per square meter) is coated on the wire side with the above formulations. The coater is run at a speed of fifty meters per minute and the blade pressure is adjusted to obtain 14 grams coating per square meter coated paper (dry coating weight), usually in the range of 8 to 18 grams per square meter. Calendaring is done using 5 nip rollers at a temperature of 60° C. and a pressure of 100 kilonewtons per meter.

Various tests were then run to determine the print quality for the coated papers. The gloss was determined at an angle of 75° using the TAPPI standardized test. The ability of the paper surface to absorb printing inks was measured using the standard brightness and K+N tests. The standardized TAPPI test method was used to determine dry pick resistance by measuring the distance along the printed surface until picking occurs, higher numbers indicating better coatings.

The wet pick resistance is measured using a standard Prufbau testing apparatus and standard ink under the following testing procedure. Two standard paper test strips are used. On the first a strip of water is applied to the middle (area B) and the edges (area A) remain dry. This is then printed on the Prufbau apparatus. The wetted portion, area B, has less ink density due not only to the fact that parts of the water-weakened coating "pick" off but also due to the fact that the wetted paper partially refuses the ink compared to the dry paper. Immediately after the first strip is printed, the second, completely dry test strip is printed on the Prufbau apparatus in the same way without drying, cleaning or re-inking the printing surface. The ink density in the second strip is greater at the edges (area C) than in the middle (area D). This is because the print surface which contacted the second strip in the middle, area D, after printing the first, partially wetted strip still had portions of wet-picked coating removed from area B, had water that was removed from printing area B, but also had extra ink which was refused when area B was printed. The ink density is measured by standard reflected light intensity means and average density values are obtained for areas A, B, C and D. These values are then used in the following relationships to calculate the value for wet pick resistance:

$$X \text{ (ink transfer in \%)} = (B/A) \times 100$$

$$Y \text{ (ink refusal in \%)} = [100D - (X \times C)/100A \times 100$$

$$Z \text{ (wet pick in \%)} = 100 - X - Y$$

As can be seen from these equations a high value for X indicates good printability, a low value for Y indicates low levels of ink refusal and low values of Z are indicating good wet pick resistance. The results of these tests on the papers coated with the various coating color formulations are shown below in Table II.

TABLE II

PAPER COATINGS

| Latex No. | 75% Gloss | Elrephro Brightness (%) | Dry Pick Resistance (cm/s) | Wet Pick Resistance (%) |
|---|---|---|---|---|
| 1* | 73 | 83 | 59 | 81 |
| 2 | 73 | 83 | 60 | 32 |
| 3 | 69 | 79 | 70 | 59 |
| 4 | 70 | 79 | 66 | 33 |

*Comparative example — not an example of the present invention.

As can be seen in Table II above, the latex compositions according to the present invention provide surprisingly improved paper coating formulations. Using the polymer dispersions according to the present invention the printability, as measured by wet pick resistance, is improved while the dry pick resistance, gloss and brightness of the coating color formulations are maintained.

What is claimed is:

1. An aqueous dispersion of a polymer composition, said polymer comprising polymerized therein (a) monovinylidene aromatic monomer, (b) acyclic conjugated diene monomer, and (c) ethically unsaturated caboxylic acid monomer(s) characterized in that the polymer also comprises polymerized therein (d) a cyanoalkyl ester of an ethylenically unsaturated carboxylic acid represented by the formula I:

$$R_1-CH=CR_3-CO-O-R_2-C\equiv N \qquad I$$

wherein independently, $R_1$ and $R_3$ are monovalent radicals of hydrogen or a lower alkyl having 1 to 4 carbon atoms with or without a second carboxylic acid functionally or cyanoalkyl ester thereof; and $R_2$ is a bivalent radical of a linear or branched alkyl having 1 to 4 carbon atoms.

2. The polymer composition according to claim 1 comprising 0.5 to 15 weight percent cyanoalkyl ester, 20 to 90 weight percent monovinylidene aromatic monomer, 9 to 79 weight percent acyclic conjugated diene monomer and 0.5 to 10 weight percent ethylenically unsaturated carboxylic acid monomer polymerized therein.

3. The polymer composition according to claim 1 further comprising a pigment.

4. The polymer composition according to claim 2 wherein the monovinylidene aromatic monomer is styrene, the acyclic conjugated diene monomer is 1,3-butadiene, the ethylenically unsaturated carboxylic acid is selected from fumaric acid, acrylic acid or blends of fumaric acid and acrylic acid and the cyanoalkyl ester is 2-cyanoethyl methacrylate.

5. The polymer composition according to claim 1 wherein there is also polymerized therein 0.5 to 14.5 weight percent (e) ethylenically unsaturated aliphatic nitrile monomer based upon 100 weight percent (a), (b), (c), (d), and (e).

6. The polymer composition according to claim 5 wherein 5 to 14 weight percent acrylonitrile is polymerized therein.

* * * * *

UNITED STATES PATENT AND TRADEMARK OFFICE
CERTIFICATE OF CORRECTION

PATENT NO. : 5,244,968

DATED : September 14, 1993

INVENTOR(S) : David Proter and Peter Hentzschel

It is certified that error appears in the above-indentified patent and that said Letters Patent is hereby corrected as shown below:

Col. 7, line 5, "diene monomer, and (c) ethically unsaturated caboxylic" should be --diene monomer, and (c) ethylenically unsaturated carboxylic--.

Signed and Sealed this

Eighth Day of November, 1994

Attest:

BRUCE LEHMAN

*Attesting Officer*     *Commissioner of Patents and Trademarks*